United States Patent

[11] 3,617,941

[72] Inventor Joseph DeLellis, Jr.
Walpole, Mass.

[21] Appl. No. 60,274
[22] Filed Aug. 3, 1970
[45] Patented Nov. 2, 1971
[73] Assignee Sylvania Electric Products, Inc.

[54] TABLE LOOK-UP MODULATOR
4 Claims, 3 Drawing Figs.

[52] U.S. Cl. .......... 332/16 R, 178/66, 325/163, 332/9 R
[51] Int. Cl. .......... H04l 27/20, H03c 3/00
[50] Field of Search .......... 332/16 R, 16 T, 9 R, 9 T, 11; 325/30, 163; 178/66, 67, 88

[56] References Cited

UNITED STATES PATENTS

| | | | |
|---|---|---|---|
| 3,289,082 | 11/1966 | Shumate | 325/163 X |
| 3,316,503 | 4/1967 | Lenz | 332/9 X |
| 3,412,206 | 11/1968 | Bizet et al. | 325/163 X |
| 3,430,143 | 2/1969 | Walker et al. | 325/163 X |
| 3,493,866 | 2/1970 | Miller | 325/30 |

*Primary Examiner*—Alfred L. Brody
*Attorneys*—Norman J. O'Malley, Elmer J. Nealon and Robert T. Orner

ABSTRACT: A table look-up modulator employs a phase control unit connected to a modulating means to generate in digital form a first and second plurality of tones at a predetermined baud rate. The phase of each tone is determined by a separate pair of input bits to be transmitted. During a first time interval (equal to the reciprocal of half the sampling rate), the second plurality of tones are heterodyned and combined with the first plurality of tones to generate a composite signal at one-half the sampling rate. During a second time interval, a signal representing an interpolated value of the second plurality of tones is generated at one-half the sampling rate. The combination of the composite signal generated during the first time interval and the signal representing the interpolated value generated during the second time interval is directed from the table look-up modulator at the sampling rate.

INVENTOR
JOSEPH DELELLIS, JR.
BY Robert T. Orner
ATTORNEY

| | | | | | | | | | | | |
|---|---|---|---|---|---|---|---|---|---|---|---|
| BAND SAMPLE NO. J COUNTER | 147 | 149 | 1 | 3 | 5 | 7 | 9 | 11 | 13 | 15 | 17 |
| GATED MODULATOR INCREMENT STORAGE 34 OUTPUT | 0 | 0 | 24 | 0 | 0 | 0 | 0 | 0 | 0 | 0 | 0 |
| INCREMENT STORAGE DEVICE 42 OUTPUT | 12 | 12 | 12 | 12 | 12 | 12 | 12 | 12 | 12 | 12 | 12 |
| TABLE ADDRESS STORAGE 48 OUTPUT | 56 | 4 | 16 | 52 | 0 | 12 | 24 | 36 | 48 | 60 | 8 |
| COSINE STORAGE 46 ADDRESS | 4 | 16 | 52 | 0 | 12 | 24 | 36 | 48 | 60 | 8 | 20 |

INVENTOR
JOSEPH DELELLIS, JR.
BY Robert T. Orner
ATTORNEY

TABLE LOOK-UP MODULATOR

BACKGROUND OF THE INVENTION

This invention relates to signal modulators, in particular to table look-up modulators useful, for example, in a differential phase-shift keying (DPSK) system.

In a conventional table look-up modulator system, tones are generated from a memory unit which stores a plurality of signals representing a single cycle of a cosine function. For a given sampling rate, the lowest frequency that can be generated by sequentially addressing the memory unit is equal to the sampling rate divided by the number of samples in the plurality of signals. When one cycle of the lowest frequency has been generated, the memory unit table address register is reset and the count starts over.

Harmonic tones of the lowest fundamental frequency are generated at the sampling rate by incrementing the table address of the memory by the harmonic number of the frequency tone to be generated. For example, the second harmonic is generated by putting out every other sample of the cosine function from the memory. In a conventional DPSK modulator, there are as many table look-up operations for each output sample as there are tones in the system. A sample of the cosine function for each tone is summed in an accumulator, and the accumulated sum is one output sample of the modulated output signal.

One disadvantage of the conventional system described hereinabove is that the table look-up and addition operations must be performed for each data sample or at the sampling rate. It would therefore be advantageous to have and it is one of the objects of this invention to provide a table look-up modulator which requires substantially half of the table look-up operations.

SUMMARY OF THE INVENTION

A table look-up modulator circuit according to the present invention includes a control means, for example, a phase-shift control means operative to generate a phase control signal in response to an input data sequence containing the modulating information. Coupled to the control means is a table look-up means which is operative in response to the control signal to generate a first and second plurality of selected frequency signals at a first predetermined rate (for example, one-half the sampling rate). A heterodyning means coupled to the table look-up means multiplies each of the second plurality of selected frequency signals by a predetermined signal to generate a third plurality of selected frequency signals.

A summation means coupled to the table look-up means and the heterodyning means is operative to add the first plurality of selected frequency signals to the third plurality of selected frequency signals to form a composite signal at the first predetermined rate. An interpolating means coupled between the table look-up means and the heterodyning means generates an interpolated value of said second plurality of selected frequency signals from two successive data intervals. The interpolated values are then heterodyned to generate a fourth plurality of selected frequency signals at a second predetermined rate (for example, one-half the sampling rate). A second control means coupled to the table look-up means and the interpolating means is operative in response to a signal to activate alternately the table look-up means and the interpolating means. The composite signal from the table look-up means in combination with the fourth plurality of selected frequency signals (the interpolated and heterodyned signals) represent a modulated form of an input data sequence at a third predetermined rate equal substantially to the sum of the first and second predetermined rates.

BRIEF DESCRIPTION OF THE DRAWINGS

The construction and operation of the table look-up modulator according to the invention will be more fully understood from the following detailed description taken in conjunction with the accompanying drawings in which.

DETAILED DESCRIPTION OF THE DRAWINGS

Figure 1:
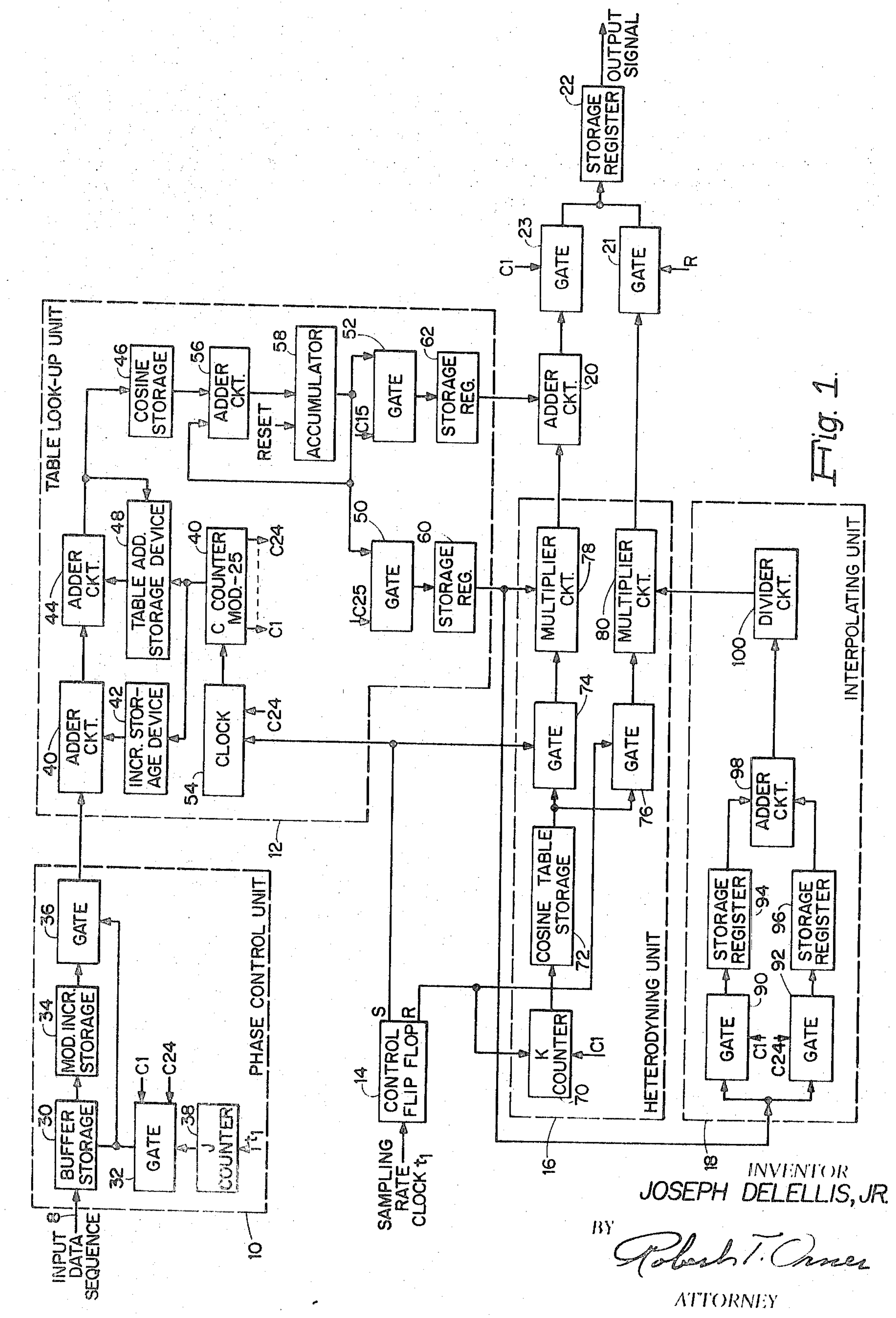
FIG. 1 is a block diagram of a preferred embodiment of the invention.

A table look-up modulator according to the present invention is shown in FIG. 1 and includes a control unit such as the phase control unit 10 having an input terminal 8 connected to a source of input signal to be modulated and an output connection connected to a first input connection of a table look-up unit 12. A second input connection to the table look-up unit 12 originates at a first output connection S of a control means such as the control flip-flop circuit 14 which has an input connection to a sampling rate clock (not shown). A heterodyning unit 16 has a first input connection from the first output connection S of the control flip-flop 14, a second input connection from a second output connection R, a third input connection from a first output connection of the table look-up unit 12, a fourth input connection from an interpolating unit 18, a first output connection to a summation means such as the adder circuit 20 and a second output connection to a gate storage means such as gate 21.

The operation of the table look-up modulator according to the present invention will be explained in a differentially coherent phase-shift keying system. When DPSK modulation is used, an audiofrequency tone is instantaneously phase shifted at discrete evenly spaced times. The number of phase shifts per second is defined as the keying rate or baud rate. The amount of phase that occurs at each baud transition is determined by the digital input data and is limited to discrete values. Normally only two-phase DPSK or four-phase DPSK is allowed at each baud transition. In two-phase DPSK one bit of input data is transmitted per tone, and in four-phase DPSK two bits of information are transmitted per tone. For a single tone system, the transmitted data is equal to the number of bits per phase shift times the baud rate.

Figure 2:
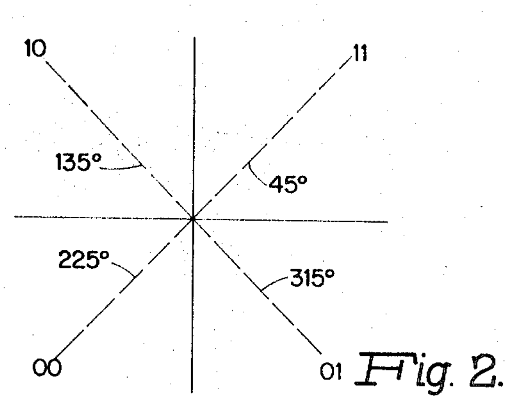
FIG. 2 is a diagram useful in explaining the operation of the embodiment of FIG. 1.

For purposes of explanation, four-phase DPSK is used to modulate a first and second plurality (for example, 16 and 9, respectively) of information bearing tones, each tone conveying two bits of the input data. At the baud update time, the phase of each tone is instantaneously shifted by 45°, 135°, 225° or 315° depending on the state of the two bits which control that tone. FIG. 2 shows the four two bit combinations and their corresponding phase shifts. Thus, the phase of each tone with respect to its phase in the previous baud determines the state of the two input data bits.

The tones are produced in the table look-up unit 12 from a predetermined number (for example, 64) of signal samples representing a single cycle of a cosine (or sine) function. The table generates the tone at half the system sampling rate to decrease the processor time. The second plurality of tones, which are in the instant example the nine higher frequency tones, are generated at frequencies below $f_s/4$ where $f_s$ is the sampling rate. The nine tones are translated in frequency in the heterodyning unit 16 and combined in the adder circuit 20 with the 15 low-frequency tones to form a composite signal representing the modulated data at half the system sampling rate.

When the control flip-flop 14 changes state, the sample which represents the nine higher frequency tones is transferred to the interpolation unit 18 where it is compared with the value of nine tones generated in the previous interval to generate an interpolated value of the nine higher frequency tones. The interpolated value is then directed to the heterodyning unit 16 where the tones are simultaneously translated in frequency and transferred to a storage register 22 at a rate equal to half the system sampling rate.

The frequency and phase of each of the 24 tones produced are controlled by the indexing of a look-up procedure, to be discussed in detail hereinafter. The tone generator mechanism is described by the following equation $$Y_l(nT') = \sin\left(2\pi \frac{nl}{64} + \phi_l\right) \quad (1)$$

where $Y_l(nT')$ = samples of the time waveform at $l$th tone,
$T'+2/f_s$ = twice the system sampling period, and
$\phi_l$ = modulation phase For example, if $l$ is set equal to one with the system operating at a 7.2 kHz. sampling rate, $Y_l(nT')$ is a sinusoid with a frequency of 56.25 Hz.

The modulation phase is updated only at the baud updating rate as determined by the phase control unit 10. At the updating boundary, the modulation phase is described by equation (2)

$$\phi_l = 2\pi \frac{16M+8}{64} \quad (2)$$

where $M$=0, 1, 2, 3.

In equation (2) the value of M is determined by the state of the two modulating bits that control tone $l$. An advance of eight places in a 64 sample cosine table represents a 45° phase shift at any frequency (i.e., any value of $l$). The phase changes, limited by the four possible values of M in equation (2), correspond to the four possible phase shifts shown in FIG. 2.

Shown in table I are the particulars for a 24-tone look-up modulator which accepts an input data rate of 2,400 bits per second. The system generates a modulated digital waveform that is suitable for transmission over a telephone line or a high-frequency (HF) radio link. The baud rate is 50 Hz. and four-phase DPSK modulation is used so that 48 bits of input information are transmitted every baud.

The first 15 tones are generated directly at a 3.6 kHz. rate and transferred to the storage register 22 via the gate 23. The upper nine tones are generated in a band between 112.5 and 562.5 Hz. and are transferred from the table look-up unit 12 to the heterodyning unit 16 where they are translated in frequency by a 2137.5 Hz. tone.

The direct tones (the lower 15) and the heterodyned sampled tones (the upper nine) are transferred from the storage register 22 to a D/A converter (not shown) which holds the analog output value until the next sample is transferred from the storage register 22. The heterodyned tones (including the interpolated tones) are transferred at the sampling rate, 7.2 kHz., and the direct tones are added to every other sample of the heterodyne tone output signals in the adder circuit 20.

TABLE I

| Modem Tone | $l$ | $f_s/2$ Generation Frequency | Heterodyne Frequency | Final Output Frequency |
|---|---|---|---|---|
| 1 | 12 | 675. Hz. | | 675. Hz. |
| 2 | 13 | 731.25 | | 731.25 |
| 3 | 14 | 787.5 | | 787.5 |
| 4 | 15 | 843.75 | | 843.75 |
| 5 | 16 | 900. | | 900. |
| 6 | 17 | 956.25 | | 956.25 |
| 7 | 18 | 1,012.5 | | 1,012.5 |
| 8 | 19 | 1,068.75 | | 1,068.75 |
| 9 | 20 | 1,125. | | 1,125. |
| 10 | 21 | 1,181.25 | | 1,181.25 |
| 11 | 22 | 1,237.5 | | 1,237.5 |
| 12 | 23 | 1,293.75 | | 1,293.75 |
| 13 | 25 | 1,405.25 | | 1,405.25 |
| 14 | 26 | 1,462.5 | | 1,462.5 |
| 15 | 27 | 1,518.75 | | 1,518.75 |
| 16 | 10 | 562.5 | 2,137.5 Hz. | 1,575. |
| 17 | 9 | 506.25 | 2,137.5 | 1,631.25 |
| 18 | 8 | 450. | 2,137.5 | 1,687.5 |
| 19 | 7 | 393.75 | 2,137.5 | 1,743.75 |
| 20 | 6 | 337.5 | 2,137.5 | 1,800. |
| 21 | 5 | 281.25 | 2,137.5 | 1,856.25 |
| 22 | 4 | 225. | 2,137.5 | 1,912.5 |
| 23 | 3 | 168.75 | 2,137.5 | 1,968.75 |
| 24 | 2 | 112.5 | 2,137.5 | 2,025. |

PHASE CONTROL UNIT 10

One embodiment of a phase control unit 10 shown in FIG. 1 includes a buffer storage device 30 having input connections from a first gate 32 and the input terminal 8 and an output connection to a modulation incremental storage phase device 34. A second gate 36 has a first input connection from the modulation incremental phase storage device 34, a second input connection from the first gate 32 and an output connection to the table look-up unit 12. The first gate has a first input connection from a J counter 38 and a plurality of input connections C1 through C24 from a counter such as the C counter 40 of the table look-up unit 12.

The phase control unit 10 effects the table look-up address mechanism at the baud rate once every 150 samples. A pulse at the sampling rate $t_1$ is directed to the J counter 38 which puts out a pulse after the 150 samples and resets itself for the next count. This pulse enables the first gate 32 to generate an output pulse for each of the pulses C1 through C24. The buffer storage device 30, in the present example, receives at the terminal 8 a 48-bit word to be stored and modulated. Each of the 24 information bearing tones is modulated by two successive bits of the 48-bit word.

The two low-order bits of the buffer storage 30 are used to address the modulator incremental storage device 34 which contains four words, each word corresponding to one of the four possible phase shifts described in equation (2). The buffer storage contents are shifted to the right at the trailing edge of the pulses C1 to C24 from the first gate 32. Thus, 24 consecutive addresses occur at the address input to increment the modulator incremental storage device 34 during the generation of the first output sample at each baud. The increments generated by the storage device 34 are allowed to pass through the second gate 36 to the table look-up unit 12. When the J counter 38 does not indicate a baud update interval, the second gate 36 generates a zero output signal to the table look-up unit 12.

TABLE LOOK-UP UNIT

An embodiment of the table look-up unit of FIG. 1 includes a second adder circuit 40 having a first input connection from the second gate 36 of the phase control unit 10, a second input connection from an incremental storage device 42 and an output connection to a third adder circuit 44. The output connection of the third adder circuit 44 is directed to a cosine storage device 46 and to a table address storage device 48, the output connection of which is connected as a second input connection of the third adder circuit 44.

The C counter 40, a modulo 24 counter, has a single output connection connected to both the incremental storage device 42 and the table address storage device 48, a first plurality of output connections C1 through C16 connected to a gate 50, a second plurality of output connections C17 through C24 connected to a gate 52 and an input connection from a clock 54. The C counter 40 includes a 5-bit binary counter which is reset after 24 counts. The output of the 5-bit counter is then decoded within the C counter 40 in a well-known manner to form one output pulse (C1 to C24) for each of the 24 states of the counter. The clock 54 has a first input connection from the S terminal of the control flip-flop 14 and a second input connection from the C counter 40. A fourth adder circuit 56 has an output connection to an accumulator circuit 58, a first input connection from the cosine storage device 46 and a second input connection from the output connection of the accumulator circuit 58.

The output connection of the accumulator circuit 58 is also connected as a second input connection to the gates 50 and 52. First and second storage registers 60 and 62 have input connections from the gates 50 and 52, respectively, and output connections to the heterodyning unit 16 and the first adder circuit 20, respectively.

The flip-flop circuit 14 is triggered at the sampling rate and is used to control the modulator operating modes. The first mode is defined as the noninterpolating mode, and the second mode is defined as the interpolating mode. When the table look-up modulator is in the noninterpolating mode, a start pulse is directed to the clock 54 which, in turn, triggers the C counter 40. The C counter 40 is a 5-bit modulo 24 counter and generates as an output signal a 5-bit binary word which is employed to address the incremental storage device 42 and the table address storage device 48. Twenty-four control pulses C1 to C24 are also furnished by the C counter 40 to provide modulator timing. When the C counter 40 reaches the count of 24, the control pulse C24 is directed to the clock 25 to inhibit the flow of clock pulses to the C counter 40.

The incremental storage device 42 and the table address storage device 48 are used to generate the address in the cosine storage device 46. Each of the 24 tones is generated at half of the sampling rate from the cosine storage device 46 by reading out of the cosine cycle at different increments. For example, modem tone 1 of table I is generated by indexing the cosine table by 12 addresses at half the sampling rate. Thus, at the time defined by pulse C1, the address presented to the storage devices 40 and 42 is 1, and the output of the incremental storage device 42 is 12 (the proper increment to produce the 12th harmonic of 56.25 Hz.)

The first input to the adder circuit 40 is the address signal from the incremental storage device 42, and the second input signal from the gate 36 of the phase control unit 10 has a value of zero except at the baud update time. In the normal operation of the noninterpolating mode (i.e., for all operations except the first sample of each baud), 24 consecutive values from the incremental storage device 42 and the table address device 48 are summed by the adder circuit 44 which is a modulo 64 adder. The output signal of the adder circuit 44 is 24 consecutive addresses for the cosine storage means 46. Each updated address from the adder circuit 44 is read back into the table address storage device 48 as the reference for the next operation of the noninterpolating mode of operation.

Figure 3:
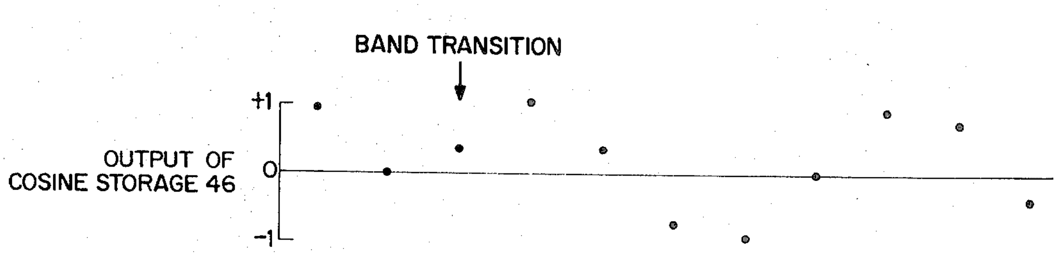
FIG. 3 is a table of address values useful in explaining the operation of the embodiment of FIG. 1.

FIG. 3 shows the address format for the cosine storage 46. The address generation is shown for one tone of the 24 that are looked up and accumulated every other output sample (i.e., samples 147, 149, 1, 3, 5, ...).

When tone number 1 is specified by the C counter 40 during the generation of the 147th output sample, the previous address of this tone in the given example is 56. Thus, the number 56 is read out of the table address storage device 44. Since tone number 1 is the 12th harmonic, the number 12 is read out of the storage device 42.

As stated hereinabove, the output signal of gate 36 is zero (except at the baud transition time) and therefore the output signal of the adder circuit 40 is the output signal of the incremental storage device 42. The output signal of the adder circuit 44 then has the value of 68 (12+56) which is a 4 in a modulo 64 system. Thus, 4 is the address applied to the cosine storage device 46 and also read back into the first memory location of the table address device 48 for the generation of the 149th output sample. Since the cosine storage device 46 stores a complete cycle of cosine waves in 64 samples, the value of the sample read out of the cosine storage device 46 for the input address 4 is equal to the cos $(4/64)\,2\pi$.

At the baud transition, an additional value is added to the address (by the adder circuit 40) to account for the instantaneous phase shift generated by the two modulating bits associated with each tone. In the example given, the modulating bits were assumed to be in the 10 state corresponding to a 135° phase shift (see FIG. 2). Since 24 samples in the cosine storage device 46 correspond to a 135° phase shift in the cosine wave, the output address of the modulator incremental storage device 34 is the number 24. Gate 32 allows the signal having a value of 24 to be added to the output signal of the incremental storage device 42 during the generation of the first sample of the baud.

The combination of the adder circuit 56 and the accumulator circuit 58 forms the running sum of the output samples from the cosine storage device 46 by adding each consecutive cosine sample to the previous accumulated sum. When the accumulator circuit 58 contains the accumulated sum of the first 16 tones, the gate 52 is enabled by the C15 control pulse from the C counter 40 transferring the accumulated sum into the storage register 62. The accumulator circuit 58 is then reset to zero. In the next nine cycles, the final nine components of the output sample are summed in the accumulator circuit 58. The accumulated sum of the final nine components is transferred by the gate 50 to the storage register 60 by the C24 pulse from the C counter 40.

Thus, the table look-up unit forms two samples. The first sample (stored in storage register 62) is the sum of the 16 tones having a frequency below $f_s/4$ where $f_s$ is the sampling rate. The second sample (stored in storage register 60) includes samples from nine tones which were generated at a rate less than one-fourth of the sampling rate.

HETERODYNING UNIT

The embodiment of the heterodyning unit 16 shown in FIG. 1 includes a K counter 70 having input connections coupled to the R terminal of the control flip-flop 14 and the C1 terminal of the C counter 40 and an output connection to a second cosine table storage device 72. Two gates 74 and 76 have first input connections connected to the output of the cosine storage device 72 and output connections connected to multiplier circuits 78 and 80, respectively. The output connections of the multiplier circuits 78 and 80 are connected to the adder circuit 20 and the gate 21, respectively.

The contents of the storage registers 60 and 62 are used to form an output sample at the start of the noninterpolating mode (i.e., at the time of each C1 pulse from the C counter 40). The K counter 70 increments its contents in response to the C1 pulse. The output signal from the K counter 70 is the address of the appropriate sample of the cosine function stored in the cosine table storage device 72. For the case shown in table I in which the heterodyning frequency is 2137.5 Hz. generated at the 7.2 kHz. sampling rate, 64 samples are used to represent a complete cycle of a cosine function, and the K counter 70 is incremented by 19 when excited by the C1 pulse or the pulse from the control flip-flop 14.

During the noninterpolating mode, the control flip-flop 14 opens gate 74, and the sample of the cosine function addressed by the K counter 70 is directed to the multiplier circuit 78. The signal sample representing the cumulative sum of the nine tones stored in storage register 60 is multiplied by the sample of the cosine function, and the resultant product signal is added to the contents of the storage register 62 by the adder circuit 20. The composite signal represents the noninterpolated sample being generated at one-half the sampling rate. The next output sample signal is generated in the interpolating mode, i.e., when the control flip-flop 14 changes state. In the interpolating mode of operation, the heterodyning sample from the cosine table storage 72 is gated through gate 76 by a pulse from the control flip-flop 14. The product of this sample and the interpolated value from the interpolating unit 18 is formed in the multiplier circuit 80 and directed through the gate 21 into the storage register 22.

INTERPOLATING UNIT

The embodiment of an interpolating unit is shown in FIG. 1 and includes first and second gates 90 and 92, respectively, each having a first input connection to the output connection of the storage register 60 of the table look-up unit 12. Gates 90 and 92 have input connections from the C1 and C24 terminals, respectively, of the C counter 40. First and second storage registers 94 and 96 have input connections from gates 90 and 92, respectively, and output connections to an adder circuit 98. A divider circuit 100 has an input connection connected to the adder circuit 98 and an output connection connected to the multiplier circuit 80 of the heterodyning unit 16.

The storage registers 94 and 96 contain two consecutive samples of the heterodyned tone sum generated during the noninterpolating mode of operation. Storage register 94 contains the samples of the upper nine tones that were held in storage register 60 at the start of the previous time interval. The data was gated into the storage register 94 from the storage register 60 during the time C1 of the previous noninterpolating mode of operation when storage register 60 contained the resultant signals of the previous heterodyned tone sum. Similarly, the gate 92 transfers the data from the storage register 60 to the storage register 96 at time C24 of the previous noninterpolating mode operation when the storage register 60 contained the results of the previously generated tone sum.

When the control flip-flop 14 changes state such that the R terminal has a control signal present, the system changes to the interpolating mode of operation. The two consecutive values stored in registers 94 and 96 are added in the adder circuit 98 and the resulting sum signal is directed to the divider circuit 100. The divider circuit 100 (which can be a multiplier circuit having multiples of one-half) divides the resultant sum signal by two and directs the quotient signal (an interpolated heterodyne tone sum) to the multiplier circuit 80 of the heterodyning unit 16.

The signal from the R terminal of the control flip-flop 14 advances the K counter 70 of the heterodyning unit 16 by the same increment (19). The K counter 70 is advanced in the noninterpolating mode. The output signal of the K counter 70 addresses in the cosine table storage device 72 the next cosine sample which is gated through the gate 76 to the multiplier circuit 80. The interpolated sample from the divider circuit 100 is multiplied by the cosine sample value at the multiplier circuit 80. The resultant product signal is a heterodyned interpolated sample of the upper nine tones and is directed through the gate 21 by the signal R to the storage register 22.

The storage register 22 receives output samples alternately from the gate 23 and the gate 21. The samples held in the gate 22 are updated at the sampling rate at the beginning of the interpolating and the noninterpolating modes. In the noninterpolating mode, pulse C1 gates in the composite signal, generated in accordance with the method described hereinabove, from the contents of the storage registers 60 and 62 through the gate 23 into the storage register 22. At the time of the C1 pulse, the storage registers 60 and 62 contain samples generated during the previous noninterpolating mode cycle. Thus, the tone samples generated during one noninterpolating mode cycle are not transferred out of the storage register 22 until the next noninterpolating mode cycle.

In the interpolating mode, the signal from the R terminal of the control flip-flop 14 gates the interpolated heterodyned signal through the gate 21 into the storage register 22. At the time described by the onset of the signal from the R terminal, the storage register 94 contains the heterodyne tone samples used in the generation of the previous composite output sample, and storage register 96 contains the heterodyne tone samples that will be used in the generation of the next composite output sample.

The combination of the noninterpolated data and the interpolated data is transferred at the sampling rate at which each of the datum were generated at half the sampling rate. Furthermore, by employing an interpolating unit only half of the table look-up operations are required.

While there has been shown and described what is considered a preferred embodiment of the present invention, various changes and modifications may be made therein without departing from the invention as defined in the appended claims.

What is claimed is:

1. A table look-up modulator comprising:

first control means operative to generate a modulation control signal in response to an input data sequence;

table look-up means coupled to said control means and being operative in response to the control signal to generate a first and second plurality of selected frequency signals at a first predetermined rate;

heterodyning means coupled to said table look-up means and being operative to multiply each of said second plurality of selected frequency signals by a predetermined signal to generate a third plurality of selected frequency signals;

first summation means coupled to said table look-up means and said heterodyning means and being operative to add said first plurality of selected frequency signals to said third plurality of selected frequency signals to form a composite signal at the first predetermined rate;

interpolating means having an input connection coupled to said table look-up means and an output connection coupled to said heterodyning means and being operative to generate an interpolated value of a set of said second plurality of selected frequency signals selected from two data intervals;

said heterodyning means being operative to multiply each of the interpolated signals by a predetermined signal to generate a fourth plurality of selected frequency signals having the interpolated value; and second control means coupled to said table look-up means and said interpolating means and being operative in response to a signal at a second predetermined rate applied thereto to activate alternately said table look-up means and said interpolating means, whereby said composite signal and said fourth plurality of selected frequency signals having the interpolated value represent a modulated form of the input data sequence at a third predetermined rate.

2. A modulator device according to claim 1 wherein said table look-up means includes:

a clock having a first input coupled to said second control means, a second input connection and an output connection and being operative in response to a signal from said second control means to generate a series of clock pulses at its output connection and being operative in response to a signal at its second input connection to inhibit the generation of said series of clock pulses;

first counter means having an input connection connected to the output connection of said clock, a single output connection and a first plurality of output connections, a first predetermined one of which is connected to the second input connection of said clock, said first counter means being operative in response to said clock pulses to generate at its single output connection a series of signals representing a series of numbers and to generate a control pulse at one of said plurality of output connections each time said first counter means generates one of said series of signal;

function storage means having input and output connections and being operative to store a predetermined number of sample signals representing one cycle of a predetermined mathematical function;

address means having a first input connection coupled to said first control means, a second input connection coupled to the single output connection of said first counter means and an output connection coupled to said function storage means and being operative in response to control signals from said first control means and the series of signals from first counter means to address predetermined samples of signals stored in said function storage means to generate a series of tone signals; and accumulator means coupled to the output connection of said function storage means and to a first predetermined one and a second predetermined one of said plurality of output connections of said first counter means and being operative in response to a signal from said first predetermined one of said plurality of output connections to accumulate a sum of a first predetermined number of said tone signals and being operative in response to a signal from said second predetermined one of said plurality of output connections to accumulate a sum of a second predetermined number of said tone signals.

3. A modulator device according to claim 2 wherein said heterodyning means includes:

second counter means having a first input connection coupled to said second control means, a second input connection coupled to said first counter means and an output connection, and being operative in response to each signal at said first and second input connections to increment a counter output signal;

cosine storage means having an input connection connected to said second counter means and being operative to store a predetermined number of signals representing one cycle of a cosine function, said cosine storage means being operative in response to each output signal from said second counter means to exit one of said predetermined number of signals representing the cosine function;

first multiplier means having a first and second input connection coupled to said cosine storage means and said accumulator means, respectively, and being operative to multiply the accumulated sum of a second predetermined number of tone signals by the output signals of said cosine storage means to form a product signal representing the heterodyned version of said tone signals; and second multiplier means having a first and second input connection, respectively, coupled to said cosine storage means and to the output connection of said interpolating means and being operative to multiply the output signals from said interpolating means by the output signals of said cosine storage means to form a product signal representing the heterodyned version of the output signals of said interpolating means.

4. A modulator device according to claim 3 wherein said interpolating means includes:

first and second storage means each having an input connection coupled to said accumulator means and an output connection, said first storage means being operative to store an accumulated sum of a second predetermined number of tone signals from a previous time interval, said second storage means being operative to store an accumulated sum of a second predetermined number of tone signals from a subsequent time interval;

an adder circuit coupled to said first and second storage means and being operative to add the signals stored in said first and second storage means; and a divider circuit having an input connection coupled to said adder circuit ans an output connection coupled to said second multiplier circuit of said heterodyning means and being operative to divide the output signal of said adder circuit by a predetermined factor to form an output signal representing an interpolated value of the signals stored in said first and second storage means.

* * * * *